(12) United States Patent
Zenz et al.

(10) Patent No.: US 7,870,538 B2
(45) Date of Patent: Jan. 11, 2011

(54) CONFIGURATION INHERITANCE IN SYSTEM CONFIGURATION (75) Inventors: Ingo Zenz, Epfenbach (DE); Thomas Mueller, Oberkirch (DE)

(73) Assignee: SAP AG, Walldorf (DE)

( * ) Notice: Subject to any disclaimer, the term of this patent is extended or adjusted under 35 U.S.C. 154(b) by 1293 days.

(21) Appl. No.: 11/322,965

(22) Filed: Dec. 30, 2005

(65) Prior Publication Data
US 2007/0168965 A1 Jul. 19, 2007

(51) Int. Cl.
G06F 9/44 (2006.01)
(52) U.S. Cl. .................. 717/121; 717/120; 717/114; 717/116; 717/118
(58) Field of Classification Search ............. None
See application file for complete search history.

(56) References Cited

U.S. PATENT DOCUMENTS

| | | | |
|---|---|---|---|
| 5,479,599 A | 12/1995 | Rockwell et al. |
| 5,608,865 A | 3/1997 | Midgely et al. |
| 5,758,154 A | 5/1998 | Qureshi |
| 5,832,503 A | 11/1998 | Malik et al. |
| 5,996,012 A | 11/1999 | Jarriel |
| 6,041,347 A | 3/2000 | Harsham et al. |
| 6,055,227 A | 4/2000 | Lennert et al. |
| 6,148,277 A | 11/2000 | Asava et al. |
| 6,161,176 A | 12/2000 | Hunter et al. |
| 6,209,018 B1 | 3/2001 | Ben-Shachar et al. |
| 6,314,460 B1 | 11/2001 | Knight et al. |
| 6,341,372 B1 | 1/2002 | Datig |
| 6,397,378 B1 | 5/2002 | Grey et al. |
| 6,421,719 B1 | 7/2002 | Lewis et al. |
| 6,490,690 B1 | 12/2002 | Gusler et al. |
| 6,735,691 B1 | 5/2004 | Capps et al. |
| 6,832,298 B2 | 12/2004 | Fujii et al. |
| 6,871,221 B1 | 3/2005 | Styles |
| 6,898,703 B1 | 5/2005 | Ogami et al. |
| 6,925,646 B1 | 8/2005 | Korenshtein et al. |
| 6,950,931 B2 | 9/2005 | Wedlake |
| 6,996,517 B1 | 2/2006 | Papaefstathiou |
| 7,054,924 B1 | 5/2006 | Harvey et al. |

(Continued)

FOREIGN PATENT DOCUMENTS

EP 1 486 867 12/2004

(Continued)

OTHER PUBLICATIONS

Non-Final Office Action for U.S. Appl. No. 11/322,511, Mailed Jan. 22, 2009, 14 pages.

(Continued)

*Primary Examiner*—Insun Kang
(74) *Attorney, Agent, or Firm*—Schwegman, Lundberg & Woessner, P.A.

(57) ABSTRACT

Methods and apparatuses provide configuration inheritance. One configuration can be derived from another (target) configuration, and properties and all content of the target configuration are inherited by the derived configuration. The derived properties and all content may exist virtually at the derived configuration, and local settings can exist locally at the configuration. The configuration architecture may allow for overwriting the derived configuration with local content to allow for modifications of the derived content to adapt to the circumstance/environment of the derived configuration.

17 Claims, 7 Drawing Sheets

U.S. PATENT DOCUMENTS

| | | | |
|---|---|---|---|
| 7,167,974 | B2 | 1/2007 | Roth et al. |
| 7,188,335 | B1 | 3/2007 | Darr et al. |
| 7,246,345 | B1 | 7/2007 | Sharma et al. |
| 7,260,818 | B1 | 8/2007 | Iterum et al. |
| 7,320,007 | B1 | 1/2008 | Chang |
| 7,343,601 | B2 | 3/2008 | Azagury et al. |
| 7,373,661 | B2 | 5/2008 | Smith et al. |
| 7,412,687 | B2 | 8/2008 | Goodwin et al. |
| 7,447,701 | B2 | 11/2008 | Agarwal et al. |
| 7,480,643 | B2 | 1/2009 | Barsness et al. |
| 2003/0009754 | A1* | 1/2003 | Rowley et al. ............... 717/177 |
| 2003/0041235 | A1 | 2/2003 | Meyer |
| 2003/0055529 | A1 | 3/2003 | Aosawa |
| 2003/0221094 | A1 | 11/2003 | Pennarun |
| 2003/0225867 | A1* | 12/2003 | Wedlake .................... 709/222 |
| 2004/0117452 | A1 | 6/2004 | Lee et al. |
| 2004/0162930 | A1 | 8/2004 | Forin et al. |
| 2004/0187140 | A1 | 9/2004 | Aigner et al. |
| 2004/0205584 | A1 | 10/2004 | Pezzanite |
| 2004/0230787 | A1 | 11/2004 | Blumenau et al. |
| 2005/0005005 | A1 | 1/2005 | Styles et al. |
| 2005/0050175 | A1 | 3/2005 | Fong et al. |
| 2005/0065993 | A1 | 3/2005 | Honda et al. |
| 2005/0071195 | A1 | 3/2005 | Cassel et al. |
| 2005/0085937 | A1 | 4/2005 | Goodwin et al. |
| 2005/0144428 | A1 | 6/2005 | Rothman et al. |
| 2005/0144528 | A1 | 6/2005 | Bucher et al. |
| 2005/0144610 | A1 | 6/2005 | Zenz |
| 2005/0240667 | A1 | 10/2005 | Koegel |
| 2005/0289169 | A1 | 12/2005 | Adya et al. |
| 2006/0041595 | A1 | 2/2006 | Taguchi et al. |
| 2006/0041881 | A1 | 2/2006 | Adkasthala |
| 2006/0047798 | A1 | 3/2006 | Feinleib et al. |
| 2006/0064673 | A1 | 3/2006 | Rogers et al. |
| 2006/0123409 | A1 | 6/2006 | Jordan, III et al. |
| 2006/0150178 | A1 | 7/2006 | Jerrard-Dunne et al. |
| 2006/0165123 | A1 | 7/2006 | Jerrard-Dunne et al. |
| 2006/0190579 | A1 | 8/2006 | Rachniowski et al. |
| 2006/0242626 | A1 | 10/2006 | Pham et al. |
| 2006/0242634 | A1 | 10/2006 | Fleischer et al. |
| 2007/0006149 | A1* | 1/2007 | Resnick et al. ............... 717/116 |
| 2007/0094359 | A1 | 4/2007 | Lamoureux |
| 2007/0118654 | A1 | 5/2007 | Jamkhedkar |
| 2007/0118888 | A1 | 5/2007 | Styles |
| 2007/0143480 | A1 | 6/2007 | Arroyo et al. |
| 2007/0156388 | A1 | 7/2007 | Kilian et al. |
| 2007/0156389 | A1 | 7/2007 | Kilian et al. |
| 2007/0156432 | A1 | 7/2007 | Mueller et al. |
| 2007/0156641 | A1 | 7/2007 | Mueller |
| 2007/0156715 | A1 | 7/2007 | Mueller |
| 2007/0156717 | A1 | 7/2007 | Zenz et al. |
| 2007/0157010 | A1 | 7/2007 | Zenz |
| 2007/0157172 | A1 | 7/2007 | Zenz et al. |
| 2007/0157185 | A1 | 7/2007 | Semerdzhiev |
| 2007/0162892 | A1 | 7/2007 | Zenz et al. |
| 2007/0165937 | A1 | 7/2007 | Markov et al. |
| 2007/0257715 | A1 | 11/2007 | Semerdzhiev et al. |
| 2008/0256531 | A1* | 10/2008 | Gao et al. .................... 717/177 |

FOREIGN PATENT DOCUMENTS

| | | |
|---|---|---|
| GB | 2374687 | 10/2002 |
| WO | WO 96/26588 | 8/1996 |
| WO | WO-03/225867 | 12/2003 |
| WO | WO 2004/109978 | 12/2004 |
| WO | WO 2005/045670 | 5/2005 |
| WO | WO-2005045670 A1 | 5/2005 |
| WO | WO-2007076944 A1 | 7/2007 |

OTHER PUBLICATIONS

Non-Final Office Action for U.S. Appl. No. 11/324,125, Mailed Jan. 23, 2009, 9 pages.
Non-Final Office Action for U.S. Appl. No. 11/322,509, Mailed Jan. 14, 2009, 17 pages.
Non-Final Office Action for U.S. Appl. No. 11/323,110 Mailed Nov. 26, 2008, 15 pages.
Final Office Action for U.S. Appl. No. 11/322,401 Mailed Nov. 19, 2008, 9 pages.
Feiler, P.H., et al.: Software Process Support Through Software Configuration Management IEEE, (1990), pp. 58-60.
Schlee, et al.: Generative Programming of Graphical User Interfaces ACM, (2004), pp. 403-406.
"U.S. Appl. No. 11/322,400, Notice of Allowance mailed May 18, 2009", 7 pgs.
"U.S. Appl. No. 11/322,401, Advisory Action mailed Feb. 26, 2009", 5 pgs.
"U.S. Appl. No. 11/322,401, Final Office Action mailed Nov. 19, 2008", 7 pgs.
"U.S. Appl. No. 11/322,401, Non Final Office Action mailed May 21, 2009", 10 pgs.
"U.S. Appl. No. 11/322,401, Non Final Office Action mailed May 22, 2008", 7 pgs.
"U.S. Appl. No. 11/322,401, Notice of Allowance mailed Dec. 31, 2009", 4 Pgs.
"U.S. Appl. No. 11/322,401, Preliminary Amendment filed Mar. 16, 2009", 11 pgs.
"U.S. Appl. No. 11/322,401, Response filed Feb. 19, 2009 to Final Office Action mailed Nov. 19, 2008", 7 pgs.
"U.S. Appl. No. 11/322,401, Response filed Aug. 22, 2008 to Non Final Office Action mailed May 22, 2008", 17 pgs.
"U.S. Appl. No. 11/322,401, Response filed Sep. 16, 2009 to Non Final Office Action mailed May 21, 2009", 10 pgs.
"U.S. Appl. No. 11/322,607, Non Final Office Action mailed Jan. 8, 2008", 10 pgs.
"U.S. Appl. No. 11/322,608, Final Office Action mailed Jul. 8, 2009", 9 pgs.
"U.S. Appl. No. 11/322,608, Non Final Office Action mailed Feb. 13, 2009", 8 pgs.
"U.S. Appl. No. 11/322,701, Non-Final Office Action mailed Jul. 6, 2009", 15 pgs.
"U.S. Appl. No. 11/322,969, Non-Final Office Action mailed Apr. 1, 2009", 11 pgs.
"U.S. Appl. No. 11/322,969, Response filed Jun. 9, 2009 to Non Final Office Action mailed Apr. 1, 2009", 11 pgs.
"U.S. Appl. No. 11/323,110, Notice of Allowance mailed Oct. 20, 2009", 6 pgs.
"U.S. Appl. No. 11/323,110, Non Final Office Action mailed Nov. 26, 2008", 10 pgs.
"U.S. Appl. No. 11/323,110, Notice of Allowance mailed May 29, 2009", 9 pgs.
"U.S. Appl. No. 11/323,110, Response filed Feb. 25, 2009 to Non Final Office Action mailed Nov. 26, 2008", 9 pgs.
"U.S. Appl. No. 11/323,110, Response filed Oct. 27, 2008 to Restriction Requirement mailed Aug. 27, 2008", 10 pgs.
"U.S. Appl. No. 11/323,110, Restriction Requirement mailed Aug. 27, 2008", 7 pgs.
"U.S. Appl. No. 11/323,438, Non Final Office Action mailed Apr. 1, 2009", 21 pgs.
"U.S. Appl. No. 11/323,438, Response filed Jun. 30, 2009 to Non Final Office Action mailed Apr. 1, 2009", 14 pgs.
"International Application Serial No. PCT/EP2006/012356, International Search Report and Written Opinion mailed Mar. 29, 2007", 8 pgs.
"J2EE Engine Bootstrap", *BIS Techdev*, printed on Sep. 26, 2005., [Online].Retrieved from the Internet: <URL: http://bis.wdf.sap.corp/twiki/bin/view/Techdev/J2EEEngineBootsrap>, 1-15.
Feller, Peter H., "Software Process Support Through Software Configuration Management", *IEEE*, (1990), 58-60.

Hall, et al., "Design: A Generic Configuration Shell, Proc of the 3rd International Conf. on industrial and engineering applications of artificial intelligence and expert systems", vol. 1, Charleston, SC 1990, (1990), 500-508 pgs.

Karlsson, et al., "Method Configuration: Adapting to situational characteristics while creating reusable assets",*Information and software technology*, vol. 46, Issue 9, (Jul. 1, 2004), 619-633 pgs.

Leffler, et al., "Building Berkeley UNIX Kernels with Config", *Computer Systems research Group*, (Apr. 17 1991), 2-1 and 2-31 pgs.

Robbins, et al., "Unix in a nutshell", *3rd edition*, O'Reily & Associates, Inc, (Aug. 1999), 215-221 and 265-266 pgs.

Schwanke, et al., "Configuration Management in BiiN SMS", *Proc. of the 11th International Conf. on software engineering Pittsburgh*, (383-393 pgs), 1989.

Symantec, Corp., "Norton Ghost™ User's Guide", *Norton Ghost™ User's Guide—Symantec. Norton Ghost The fast pc cloning solution.*, (1999), 138 pgs.

Williams, et al., "Embedded Linux as a platform for dynamically self-reconfiguration systems-ON-CHIP", (21-24 pgs), 163-169 pgs.

Office Action dated Feb. 20, 2008 for U.S. Appl. No. 11/322,608.

Office Action dated Jan. 8, 2008 for U.S. Appl. No. 11/322,607.

Office Action dated Mar. 19, 2008 for U.S. Appl. No. 11/322,701.

Office Action mailed Jun. 26, 2008 for U.S. Appl. No. 11/322,607.

Office Action mailed May 22, 2008 for U.S. Appl. No. 11/322,401.

Office Action mailed May 23, 2008 for U.S. Appl. No. 11/322,400.

Int'l Application No. PCT/EP2006/012357 Int'l Search Report and Written Opinion mailed Mar. 29, 2007.

PCT/EP2006/012356 International Search Report and Written Opinion dated Mar. 29, 2007.

Int'l Application No. PCT/EP2006/012358 Int'l Search Report & Written Opinion dated Jun. 14, 2007, 5 pgs.

Int'l Application No. PCT/EP2006/012421, Int'l Search Report & Written Opinion dated Oct. 2, 2007.

Anonymous, "Using a Template Processor to Simplify Programming", Research Disclosure, Mason Publications, Hampshire, GB, vol. 41, No. 413, (Sep. 1, 1998), 1-3.

Heiss, Oracle Process Manager and Notification Server Administrators Guide; 10g Release 2 (10.1.2) Dec. 2004 XP002449016; Redwood City, CA, USA, Retrieved from the Internet: URL: http://download.oracle.com/docs/cd/B14 [ret'd on Aug. 31, 2007] pp. 1-1 to pp. 1-26 and pp. 3-1 to pp. 3-30.

Accomazzi, Alberto et al.: Mirroring the ADS Bibliographic Databases Astronomical Analysis Software and Systems VII, ASP Conference Series, vol. 145, (1998), 395-399.

Bartell, Randy L. et al.: The Mediaxact System—A Framework for Personalized Electronic Commerce Systems; Bell Labs Technical Journal, vol. 4, Issues 153-173, (Apr.-Jun. 1999), 153-173.

Cutler, Ellie: SCO UNIX in a Nutsell O'Reilly & Associates, Inc., Cambridge, MA, (Jan. 1994), 154-158.

Duquette, William H. et al.: Data Definition and Code Generation in TCL; RIDE-VE '99, Sydney, Australia, (Mar. 23-24, 1999), 1-10.

Fernandez, Mary et al.: Silkroute: Trading Between Relations and XML; Computer Networks, vol. 33, Issues 1-6, (Jun. 2000), 723-745.

Hatley, John W.: Automatically Generating Procedure Code and Database Maintenance Scripts; Ingres World, Chicago, IL, (Oct. 2-6, 1994), 1-11.

Microsoft Press: Microsoft Computer Dictionary; 4th Edition, Redmond, WA, (1999), 123 and 183.

Final Office Action mailed Sep. 2, 2008 for U.S. Appl. No. 11/322,701.

Final Office Action mailed Sep. 4, 2008 for U.S. Appl. No. 11/322,608.

"U.S. Appl. No. 11/322,401, Ex-Parte Reexamination Office Action Mailed Mar. 30, 2010", 4 pgs.

"U.S. Appl. No. 11/323,110, Notice of Allowance mailed Feb. 17, 2010", 4 Pgs.

"U.S. Appl. No. 11/322,401, Notice of Allowance mailed Jun. 1, 2010", 5 pages.

* cited by examiner

CONFIGURATION INHERITANCE IN SYSTEM CONFIGURATION

FIELD

Embodiments of the invention relate to system configuration settings, and more particularly to deriving settings from other settings.

BACKGROUND

System configuration allows a system to define the values of properties of the system that affect how the system operates. In a network environment, configuration for a system may be obtained over the network. Many times various systems within a network have similar configuration, and may include many or all of the same properties, with a difference in value of the properties. The differences in values may define the difference in system capabilities, and apply a similar application or use case to particular systems. Because systems often include similar configuration fields, there could be a great deal of redundancy in a system regarding configuration of systems with the network. Additionally, changes in system configuration may be desirably extended to every instance of the system in the network. Traditional approaches may require changing each system's configuration.

System configuration has also traditionally been tailored to the system in question, with specific static values relative to the system in question being used to define the configuration. The system-specific values reduce the portability of configuration to systems that share equal properties. In many networks there are differences in the systems that prevent the configuration of one from applying to the other. Thus, there can be a great deal of redundant configuration information within a network, and a great deal of redundant effort to change configuration information.

SUMMARY

In a network system a configuration can be derived from another (target) configuration, and properties of the target configuration are inherited by the derived configuration. The derived properties may exist virtually at the derived configuration, and local settings can exist locally at the configuration. The configuration architecture may allow for overwriting the derived configuration with local content to allow for modifications of the derived content to adapt to the circumstance/environment of the derived configuration.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A configuration machine/manager can manage a dynamic system configuration that can adapt itself to a specific system environment. For purposes of simplicity and consistency of description, the term "configuration machine" will be used to describe any implementation of an entity to manage configuration as described herein. It will be understood that a configuration machine could include hardware and/or software to implement the management/control features described. Thus, the use of the term configuration machine will be understood as including any entity with the features described herein, and should not be understood as limiting.

The configuration machine in the context of a dynamic configuration includes features for parameterized and computed configuration. The dynamic configuration can be implemented with templates or other default settings. As used herein, "template" refers to a group, set, structure, etc., of one or more settings that can be used as defaults, or master settings, or other mechanism from which a setting may be derived or obtained. A template can be pushed to a system and/or requested and obtained from a system. As used herein, "configuration" refers to one or more settings or values that define a state, an operation, a value, or other value that directs or affects how a computing device operates. A setting thus refers to any property, or value, whether directly or indirectly (e.g., linked) obtainable/usable, and/or whether dynamic or static.

The configuration machine can derive one or more configuration setting from another configuration to reduce redundancy of information within a system/group of systems. To enable the derivation of settings, the configuration machine may provide features for linking to values and inheriting configuration. In short, instead of having all configuration settings within a networked system be static values for system dependent configuration as is done in traditional systems, the configuration machine can enable the use of parameterized settings to provide dynamic configuration. Parameterized settings include parameters provided by the configuration manager, which can be transparently substituted during runtime. The substitution of actual values, which can be referred to as computed or direct values, for the parameterized settings, can be referred to as resolving the parameterized setting or computable expression. As used herein, a parameterized value refers to a dynamic value as set forth above, which can be provided by the system context/profile, and may be referred to as a computable expression, as discussed in more detail below. A system profile may contain system dependencies (e.g., host names, operating system information, installation directories, etc.) in addition to hardware dependencies (e.g., number of CPUs, amount of physical memory, etc.).

In one embodiment, a parameterized value includes a simple arithmetic expression that may contain system parameters from a system profile. The system profile refers to one or more values or parameters that describe a system (e.g., system properties, numbers of particular elements (e.g., processors, amount of memory), capabilities, etc.). The system may be any entity that has services, managers, etc., which provide functionality in a network (e.g., one or more server nodes). The system profile may be stored in the configuration machine and/or the configuration machine may have access to another network location where the profile is stored. During or at runtime, the configuration machine can substitute or resolve parameters, for example, by transparent substitution of indirectly referenced values and/or evaluating an arithmetic expression. Computed settings allow a system to utilize a dynamic setting where a simple parameter substitution is not sufficient, for example, where a value needs to be calculated in light of specific system parameters (e.g., number of nodes, heap size, etc.).

Settings may also include a link to other settings, which may be referred to as a "value link." Thus, if a setting is dependent on another setting stored elsewhere, a value link establishes a relationship between the settings, and defines one setting in terms of another. During or at runtime a value link is transparently resolved and substituted. Value link settings may be combined with the feature of computed and parameterized values, for example, in a case where a system dependent configuration cannot be configured via simple parameter substitution. Thus, a value link may refer to a computed value setting, and/or a value link may be included within a computed value.

Examples of a computed/calculated value may be the following. A Telnet port may be defined as: 50000+100*${INSTANCE_NUMBER}+8, where instance number refers to a parameter that may be obtained from a system profile, and might be different from one system to another (meaning a dynamic parameter). A number of server nodes per instance may be defined as: 2*${CPU_COUNT}, where CPU_COUNT represents a dynamic parameter. A maximum heap size could be defined as: 128 max (${AMOUNT_MEMORY}/${CPU_COUNT}), where dynamic parameters and a "max" operation are used. An arithmetic expression may include any combination of parameters, constants, simple operators, and brackets. In one embodiment, supported operators may include: '+', '−', '*', '/', 'min', 'max'. A "round" function (e.g., expr=round(expr1)) or a "truncate" function (e.g., expr=trunk(expr1)) could also be used.

In one embodiment, the configuration machine supports an inheritance relationship between configuration objects. A configuration object is any object (referring to a structure in which data and control/behavior characteristics are associated together) that includes data related to configuration, and may specifically have configuration settings. Although a configuration object may be understood in light of object-oriented programming languages (e.g., JAVA), an object as used herein may refer to any mechanism or structure that allows behavior to be defined for data types. The semantics of configuration inheritance may be described as follows. In one embodiment, all the following apply. In alternative embodiments, one or more of the following apply as configuration inheritance. In a case where configuration B is derived from a configuration A:

1) Configuration content available in A that does not exist locally in configuration B is inherited, and thus visible in configuration B;

2) Local content of configuration B has priority over inherited content from configuration A, which allows content to be overwritten locally in configuration B, which causes the content to be generated to exist physically in configuration B. The overwritten local content will be visible in configuration B and not the inherited content available from configuration A;

3) All content of a configuration (e.g., configuration entries, files, sub-configurations) is subject to inheritance;

4) The inheritance relationship is assigned to the whole configuration sub-tree, rather than to only one configuration node. Assigning the inheritance relationship the whole configuration sub-tree implicitly defines an inheritance relationship to a local sub-configuration of configuration B (e.g., $B_{sub1}$) from a corresponding sub-configuration of configuration A (e.g., $A_{sub1}$). A "corresponding" sub-configuration refers to a sub-configuration that has a relationship with another configuration, and generally refers to a similarity between the configurations (e.g., they derive from common nodes with the primary configurations, for example, A-node 1 and B-node 1). In one embodiment, the sub-configuration inheritance relationship holds even in a case where the corresponding sub-configuration in configuration A does actually exist in configuration A. Thus, if a corresponding sub-configuration in configuration A were later generated in configuration A, the sub-configuration of configuration B would inherit from it;

5) A derived sub-configuration in configuration B cannot be explicitly created. All sub-configurations in B are implicitly derived from corresponding sub-configurations in configuration A, so no explicit derivation needs to be, or can be, created.

Inherited configuration may be restricted from modification. In one embodiment, a configuration and/or property/setting of a configuration is flagged or otherwise indicated as non-modifiable, unchangeable, or "final." A configuration that is non-modifiable refers to a configuration that can be derived, but one or more elements or properties of the derived configuration cannot be locally modified. In the case of an entire configuration being flagged as non-modifiable, the deriving configuration may be prevented from adding, deleting, or modifying any content in the entire configuration. The default configuration can still be modified, which would change the properties of the derived configuration, but the derived configuration may be prevented from making any changes. By implication, sub-configurations and properties of a configuration marked as non-modifiable can be likewise non-modifiable. In the case that only specific content/properties of a configuration are flagged as final, the particular flagged content cannot be changed, but other content may be. As with entire configuration marked as non-modifiable, specific flagged content may be changed in the default configuration. Thus, a default configuration may include one or more flagged properties, or the entire default configuration may be flagged as non-modifiable. A configuration derived from the default configuration with "final" properties may modify properties not flagged as non-modifiable, but may not modify the flagged properties/configurations.

In one embodiment, a configuration template contains one or more predefined instance configurations for a specific use case or scenario (e.g., Portal+KM (knowledge management), Minimal Instance, J2EE (JAVA 2 Enterprise Edition of SUN MICROSYSTEMS, Inc., of Santa Clara, Calif.) Developer, etc.). In one embodiment, a configuration template may be implemented in a system that does not contain any system dependent configuration; rather, all system dependencies are configured via dynamic configuration resolved through a configuration machine. In this way, a configuration template can be system-independent and can be moved between different systems. As used herein, "system-independent" refers to being independent, or not including settings or data limited to a specific property of a specific implementation of the setting/data. For example, a template can be established for a network of computing devices (e.g., instances with their server nodes), each of which will have one or more instances of a configuration. The template can be considered system-independent if defined to enable all instances within the system of the network. All instances could use the same template and incorporate settings specific to each instance, which may be different in other instances of the system. Thus, a configuration template can be derived from a default configuration and overwrite settings of the default configuration according to a specific usage to which the template is assigned. In one embodiment, a template can be homogeneously configured, with all server nodes of an instance sharing one and the same configuration.

A configuration template may contain many different elements, depending upon the implementation of the template and the system for which the template provides configuration (e.g., scenarios for portal+KM, J2EE developer, etc.). In one embodiment, a configuration exists for an enterprise environment where a configuration template includes one or more of the following: instance layout configuration related to a number of server node running on an instance (determined, for example, by an arithmetic expression dependent on the hardware (e.g., number of central processing units (CPUs) and memory) available), a JAVA Virtual Memory (JVM) configuration with VM settings and VM parameters to enable the instance layout to dynamically adapt itself to the environment on which the instance is running, a kernel configuration, an application configuration, service settings, a file system configuration, system component configurations, etc. The list should not be understood as an exhaustive description of possible configuration properties, nor are all elements of the mentioned elements required. Thus, the list is to be understood as merely one example of possible types of configuration that a template may include, and other implementation may include more or fewer elements, and/or different elements.

In one embodiment, the configuration templates are derived from a configuration "basic instance" that defines the basic structure of an instance configuration. In one embodiment, the derivation from the basic instance can be indirect through another level between the instance configuration and the configuration templates. For example, a "basic instance customized" can be defined for the system configuration, and provide a mechanism to store and change system global configuration settings. Configuration templates can be limited to modification only via deployment. Thus, configuration changes occur through changes at a system level configuration, and changes to a template may not be possible via configuration tools (e.g., Visual Admin, Web Admin, Config-Tool, etc., of a system available from SAP AG of Walldorf, Germany).

A special "minimal instance" template can be defined for use during instance installation. The minimal instance can contain everything needed to run the central configuration. The central configuration can then be used to select and set a specific use case template for the instance to be configured.

The system configuration contains the configuration of the actual system. The actual system configuration is the configuration of the actual instances belonging to the system. An instance is assigned to the use case and scenario which is to be executed by the instance during runtime. Thus, the instance configuration can be derived from the configuration template belonging to the corresponding use case and scenario. The implementation of a configuration can be said to be implemented in a configuration consumer, which may refer to any application, system service, system manager, or other server entity on, for example, a server node.

As the configuration template contains the system dependencies in a dynamic way (e.g., with parameterized and computed settings), the actual instance configuration may not need to overwrite a setting for the system dependencies defined in the template. The system dependent configuration will dynamically adapt itself to the actual system environment. Therefore, the engine runtime itself does not need any additional configuration, and can operate without overwriting any settings inherited from the configuration template.

In some cases, there may be a need to customize additional engine components (e.g., configuring landscape connectivity, etc.). Additional customizing configuration can be performed at a special customizing layer per configuration template. When the first instance for a specific configuration template is created, a first customizing configuration for the template can be created within the system configuration. The customizing layer may be derived from the actual template, and the instance configuration may be derived from the customizing layer of the selected template. Configuration changes on the level of the custom layer are visible across all instances assigned to the same configuration template.

Figure 1:
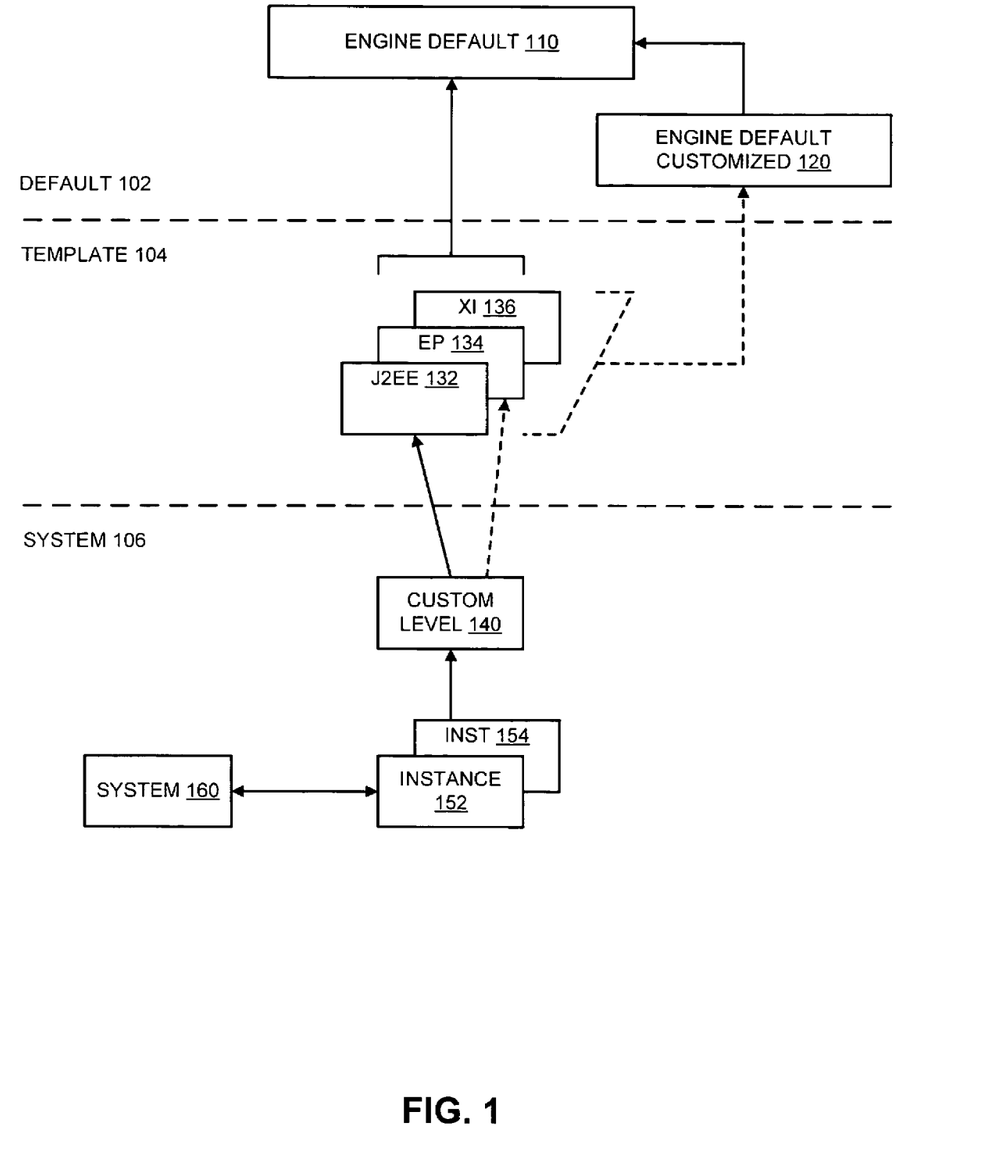
FIG. 1 is a block diagram of an embodiment of an architecture to determine a configuration setting.

FIG. 1 is a block diagram of an embodiment of an architecture to determine a configuration setting. The architecture of FIG. 1 includes different levels of configuration settings. Specifically shown are a Default level 102, a Template level 104, and a System level 106. Additional or different levels may be used. In general, the different levels represent a basic, system-independent, generic level (Default level 102), a system-independent level that may include use-cases (Template level 104), and a system-specific level (System level 106).

Engine default 110 represents a default configuration as described above, which provides system-independent configuration settings. Engine default 110 provides defaults for an software engine suite, for example, a J2EE engine, upon which instances of an application, program, routine, etc., will be based. Engine default 110 can include any number of configuration settings, and any type of settings that are desired to be common across all systems and all implementations in a network. In one embodiment, Default level 102 includes engine default customized 120, to provide a degree of further customization for a cluster (or instance of a cluster). Engine default customized 120 derives from engine default 110, and can provide specific details for an enterprise or a network. For example, engine default 110 may be a configuration suite available for any system to be developed in any system within an enterprise, or within any enterprise that will employ a particular application, software, etc. Engine default 110 can thus be generic to any system within an enterprise, for example, and be ported across the entire enterprise. Engine default customized 120 can be a logical level lower, and provide customization that is specific to a particular network, or department. If a department wants particular settings to apply to all systems within the department, it may generate engine default customized 120 to provide those defaults.

Templates 132-136 may derive directly from engine default 110. Additionally, depending on the implementation, templates 132-136 may derive from engine default customized 120, to provide the customized settings in all use case templates. In the example of FIG. 1, template J2EE 132 provides an example of a template for a J2EE development environment, with associated settings that are appropriate within the context of engine default customized 120. Also shown are template enterprise portal (EP) 134 that provides configuration settings for portals to be used in systems of the network. Enterprise portals provide single points of access to a network and/or to network content. The settings of EP 134 provide the default configuration for access with portals in any application that uses portals. Thus, the settings of EP 134 provide a default configuration for a system where a portal is being executed. Template exchange infrastructure (XI) 136 can provide configuration setting defaults for exchange infrastructures for accessing business objects within an enterprise.

In one embodiment, System level 106 may include custom level 140, which provides another optional custom layer. Custom level 140 derives from the templates as a whole, or from individual templates. Thus, custom level 140 can provide custom system level configuration for each template system 160 may use, or multiple custom level can exist and derive from each template separately. Custom level 140 may provide a custom configuration setting on System level 106 for each instance of a particular type of template (e.g., all J2EE instances), or custom level 140 may provide a custom configuration setting for instances of different types (e.g., J2EE and EP instances). Instances 152-154 derive, in turn from custom level 140. In one embodiment, one or more instances 152-154 may derive directly from a template. Each instance implementation obtains the default configuration settings, unless the settings are overwritten at System level 106 (e.g., custom level 140), or higher up (e.g., engine default customized 120, a template).

The configuration settings are passed to system 160 for implementation in each instance on system 160. System 160 is to be understood as any type of computing device, including, but not limited to, a desktop computer, a laptop computer, a server-class device, a handheld device, etc. The indirect values of configuration settings in Default level 102 and Template level 104 are resolved by a configuration machine to be implemented at System level 106. In this manner portable configurations can be generated and ported from one system to another, with the indirect values of the computed values, value links, parameterized settings, etc., resolved for implementation of the configuration in system 160.

Figure 2:
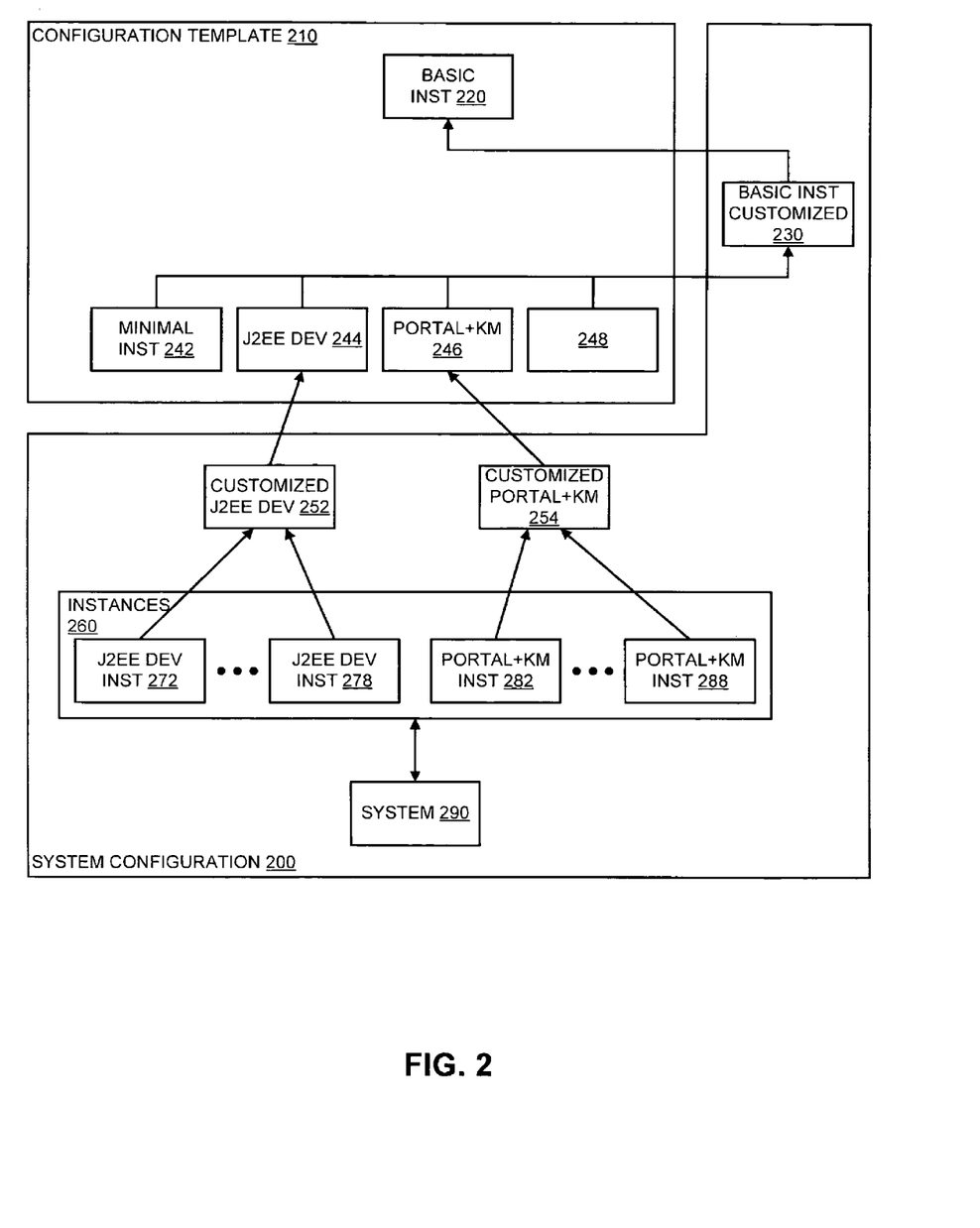
FIG. 2 is a block diagram of an embodiment of an architecture having a basic instance and a customized instance of a setting to determine a configuration setting for a system.

FIG. 2 is a block diagram of an embodiment of an architecture having a basic instance and a customized instance of a setting to determine a configuration setting for a system. Configuration template 210 provides an example of a default as described herein, which may include a template. Configuration template 210 includes basic instance 220, which represents a basis from which the configuration machine will derive configuration settings for a system. Basic instance customized 230 can provide custom configuration changes to basic instance 220, to enable a user (e.g., an administrator, a developer), to modify the basic instance defaults for specific scenarios within a system of a network.

Instance templates can derive from basic instance customized 230. Examples of instance templates include minimal instance 242, for use in initializing a system, J2EE developer instance 244, for example, for use by an engineer, portal+KM (knowledge management) instance 246 for use in providing portal access to an enterprise on a system, and any other instance 248 that may be provided. Within system configuration level 200 there may be customized J2EE developer configuration 252 and customized portal+KM configuration 254, which derive from corresponding templates. Thus, customized J2EE configuration 252 derives from J2EE developer template 244. Customized J2EE configuration 252 allows custom settings to be defined for corresponding system level instances (e.g., all instances within a cluster). Thus, instances 260 includes J2EE developer instances 272-278, which derive from customized J2EE developer configuration 252, and portal+KM instances 282-288 derive from customized portal+KM configuration 254. Instances 260 can be implemented on system 290.

Regarding the relationship of the elements in FIG. 2, the arrows point to the source of inheritance, or from where an element is derived. Thus, a change on the level of customized portal+KM configuration 254 applies to all portal+KM instances 282-288 within the cluster. Configuration for a single instance can be changed on the instance level (e.g., a change within instance 282). To change a setting not only on the level of one usage (e.g., for one template), but for the whole network, and thus for all usages which are activated in the network (e.g., a configuration setting is to be changed for all J2EE developer instances 272-278 and all portal+KM instances 282-288), the configuration change is performed on the level of basic instance customized 230. All instances inherit configuration (e.g., properties, content, data) from basic instance customized 230, and thus a configuration change on this level is visible globally, unless it is overwritten locally, or down the chain. A configuration machine provides resolution of settings that have indirect values, or settings with references to be resolved at runtime. The configuration machine ensures that configuration settings sent to system 290 have direct value parameters that can be implemented on system 290.

In one embodiment, instances may be configured via different configuration templates. In another embodiment, all instances are configured via the same configuration template, and instances configured for different usages.

Figure 3:
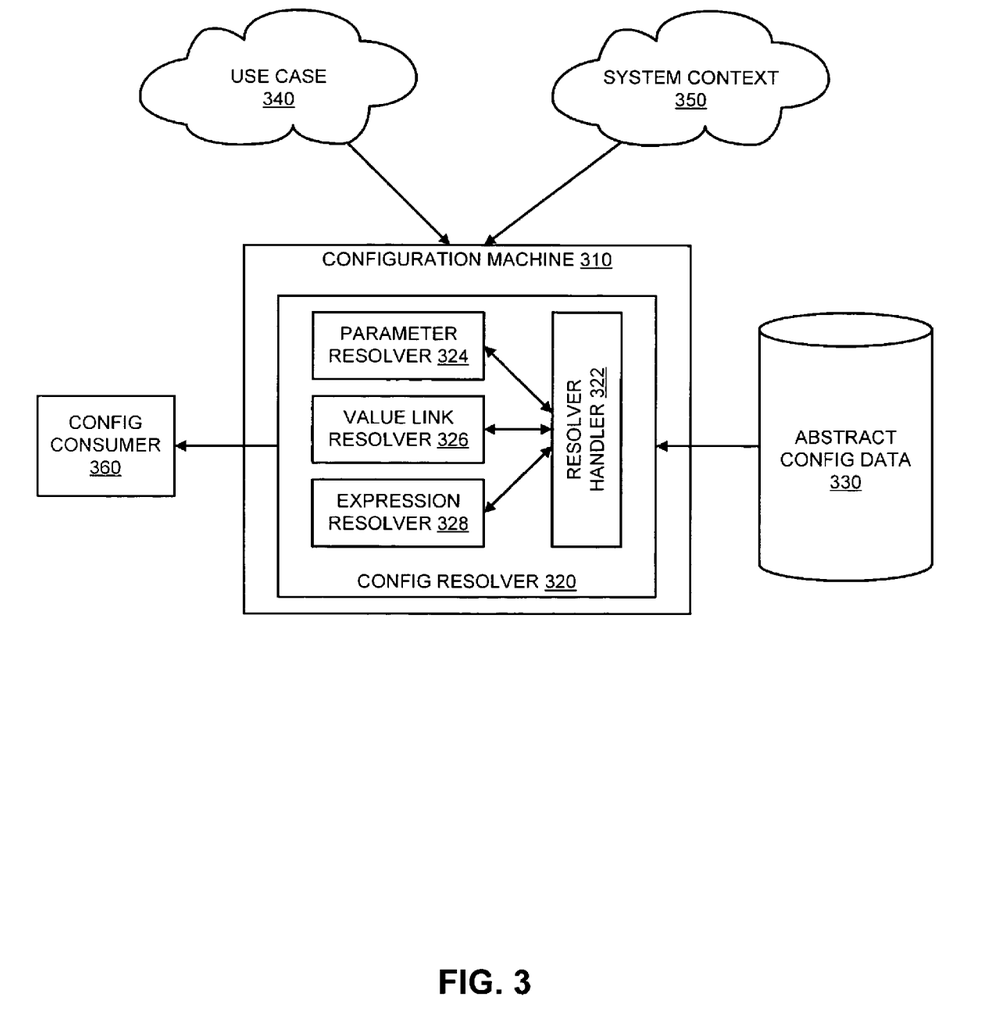
FIG. 3 is a block diagram of an embodiment of network system with a configuration machine.

FIG. 3 is a block diagram of an embodiment of network system with a configuration machine. Configuration machine 310 represents an embodiment of a configuration machine according to any embodiment referred to herein, or other entity that provides resolving or substitution of values for settings to a system. Configuration machine includes configuration resolver 320, which provides the functionality to resolve indirect value settings. In one embodiment, resolver 320 includes resolver handler 322, which may filter incoming configuration settings to make sure they are settings that can be set in configuration consumer 360 (e.g., a system component, service, manager). Configuration machine 310 receives one or more settings from abstract configuration data 330, which represents parameterized configuration, or any other indirect values for settings. Note that abstract configuration data 330 may exist in the same physical memory as static settings. Thus, abstract configuration data 330 is not to be interpreted as necessarily occupying separate memory/storage space, although it may.

Configuration settings are received by resolver handler 322, which can determine if a setting requires resolution, or whether they are actual values and can be forwarded to configuration consumer 360. If resolver handler 322 determines that the setting requires resolution because it is an abstract value, the appropriate corresponding resolver is selected to resolve the setting. In one embodiment, a setting that has an abstract value is flagged. The flag may be a field (e.g., bit or byte) on the setting, or metadata, or any other mechanism to indicate the setting should be resolved prior to sending to configuration consumer 360. The flag is stored with its corresponding dynamic value in a configuration storage.

Resolver handler 322 may determine the type of resolver corresponds to the type of abstract data. In one embodiment, resolver handler 322 includes a parser that can parse the expression of the setting and determine whether a parameter substitution, calculated value, etc., is included. In an alternate embodiment, the flag that indicates the abstract data may indicate the type(s) of resolver that should be used. If the setting includes a parameter, resolver handler 322 may pass the parameter or the expression to parameter resolver 324 to obtain the value. Parameter resolver 324 may obtain specific values referenced in the expression, for example, from a profile of the system stored in configuration machine 310 or somewhere accessible to configuration machine 310. If the setting includes a value link, resolver handler 322 uses value link resolver 326 to determine the value to which the value link points. If the setting includes a calculated value, resolver handler 322 uses expression resolver 328 to determine the value of the expression. One setting can also combine different dynamic values (e.g., one or more parameterized values combined with one or more calculated values), in which case the resolving may be processed analogously as if only one dynamic value is used.

In one embodiment, a setting may include multiple forms of abstraction. For example, a value link may point to a calculated value. Thus, resolver handler 322 may use value link resolver 326, which returns the computable expression to resolver handler 322. Resolver handler 322 may then pass the expression to expression resolver 328 to compute the expression. If the expression has an indirect parameter, resolver handler 322 may be requested by expression resolver 328 to pass the value of the indirect parameter to expression resolver 328 to resolve the value of the expression. Thus, resolvers 324-328 may exchange multiple times between resolver handler 322 to obtain a final value for a setting. Once a final setting value is obtained, the setting can be passed to configuration consumer 360 for setting the value in its configuration.

In one embodiment, configuration machine 310 caches results of parameters, calculated values, or other setting properties that are resolved. The cache size and cache management are implementation-specific. Caching the results can allow resolver handler 322 to bypass operations performed by the resolvers to determine a value of an abstract value. For example, resolver handler 322 can check a cache when a setting is received, and determine whether any indirect values in the setting have previously been resolved. If the values have been resolved, resolver handler 322 may input the cached result without having to allow the resolvers to process the abstract values.

Configuration machine 310 can receive input from (or obtain data from) use case 340 and system context 350. Use case 340 and system context 350 may specify or imply what template(s) should be obtained from configuration data, which in turn can indicate what abstract data to retrieve from abstract configuration data 350. Use case 340 and system context 350 may specify what defaults should be used, and/or what default values to override with local information.

Figure 4:
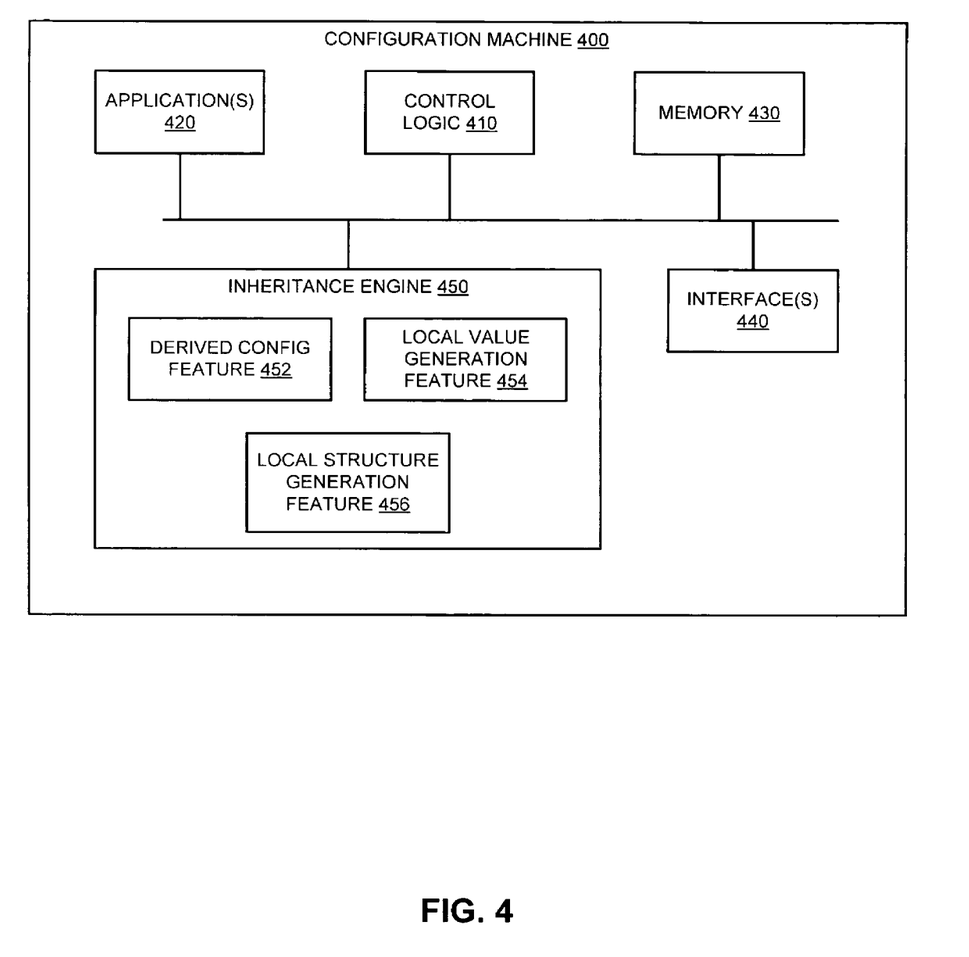
FIG. 4 is a block diagram of an embodiment of a configuration machine.

FIG. 4 is a block diagram of an embodiment of a configuration machine. Configuration machine 400 is an example of a security configuration machine according to any embodiment described herein. In one embodiment, configuration machine 400 resides on a network server. Alternatively, configuration machine 400 can exist independently as a standalone device, or as part of a component of a network.

Configuration machine 400 includes control logic 410, which implements logical functional control to direct operation of configuration machine 400, and/or hardware associated with directing operation of configuration machine 400. Logic may be hardware logic circuits and/or software routines. In one embodiment, configuration machine 400 includes one or more applications 420, which represent code sequence and/or programs that provide instructions to control logic 410. Configuration machine 400 includes memory 430 and/or access to memory resource 430 for storing data and/or instructions, including configuration settings. Memory 430 may include memory local to configuration machine 400, as well as, or alternatively, memory of a network of which configuration machine 400 is a part. Memory 430 may include dynamic and/or non-volatile memory. Configuration machine 400 also includes one or more interfaces 440, which represent access interfaces to/from configuration machine 400 with regard to entities (electronic or human) external to configuration machine 400. Interfaces 440 may include interfaces from configuration machine 400 to configuration management functions operating in the network (e.g., a network interface and/or network interface circuit).

Configuration machine 400 also includes inheritance engine 450, which represents one or more functions that enable configuration machine 400 to provide management of inheritance from one configuration to another. The functions can include, or are provided by, one or more of derived configuration feature 452, local value generation feature 454, and local structure generation feature 456. Other features may be included, making other versions of inheritance engine 450 that are more or less complex than what is shown. As used herein, "feature" may refer to a function, a module, a routine, a subsystem, etc., whether hardware, software, or some combination. Thus, "feature" should be interpreted in an illustrative, and not a restrictive sense. Each feature could be a module within configuration machine 400.

Derived configuration feature 452 enables inheritance engine 450 to generate and/or manage inheritance between configurations. Inheritance engine 450 can derive one configuration from another. Deriving one configuration from another refers to generating one configuration by having the derived configuration reference one or more property of the target configuration. Configuration may be limited to "single" inheritance, where a linking configuration can only link to a single target configuration. The resulting derived configuration can include one or more properties that are the same as the other configuration. The similarities of configurations can be in content and/or structure of the configuration. Derived configuration feature 452 allows configuration machine 400 to manage configurations, determining what configuration or part thereof derives from another. In one embodiment, deriving one configuration from another refers to having content in the derived configuration point to properties of the target configuration (described in more detail below). Inheritance engine 450 can thus maintain consistency of information between configurations. In one embodiment, the target configuration is a template or other default configuration. The deriving configuration may be a customized level template, a system-level implementation, or other configuration deriving from a higher-level configuration.

Local value generation feature 454 enables inheritance engine 450 to include local information to a derived configuration. Thus, a configuration may include information that references another configuration (e.g., an instance configuration points to a configuration that has the desired template properties), can also include one or more local settings. Thus, the derived configuration may have one or more fields or properties that are not mentioned or addressed in the target configuration (meaning the configuration from which the derived configuration is derived).

Local structure generation feature 456 enables inheritance engine 450 to overwrite properties of a derived configuration with local information. Thus, a configuration may derive a property from a target configuration, and replace the setting supplied as a default with a custom or any local value. Replacing the setting means that rather than having the default setting applied in an implementation of the derived configuration, the active parameter that affects the system to which the configuration applies is the local parameter. In one embodiment, all local values have priority over default values of the linked configuration, which can thus be locally overwritten.

In one embodiment, a configuration only includes locally configuration properties that are different from defaults. Thus, if a property exists physically at the local level and not the default level, or if the value of a property defined at the default level is overwritten with a local value, the local configuration includes the actual structure that defines the differences. Specifically, in a case where the configurations are defined in terms of data structures, a configuration has actual values stored within the data structure for properties that differ from the default configuration data structure, and other properties have references to the default data structure. In one embodiment, the data structure can be defined in terms of data objects, and reference is made to the data objects, which exist at the level of the default configuration. In this way, inheritance engine 450 establishes a local copy with the value changes where only a virtual copy existed previous to any change. The term "virtual" in terms of a configuration existing virtually refers to the configuration setting/property making reference to a value that resides physically in a configuration storage (e.g., a database); virtual content resides only in memory (e.g., random access memory (RAM)) and not in a configuration storage.

Modules and/or engines as described herein are components that may include hardware, software, and/or a combination of these. Software to instruct a machine to implement the techniques herein, or software to use to manufacture a device to perform the techniques described herein may be provided via an article of manufacture by a machine/electronic device/hardware. An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 5:
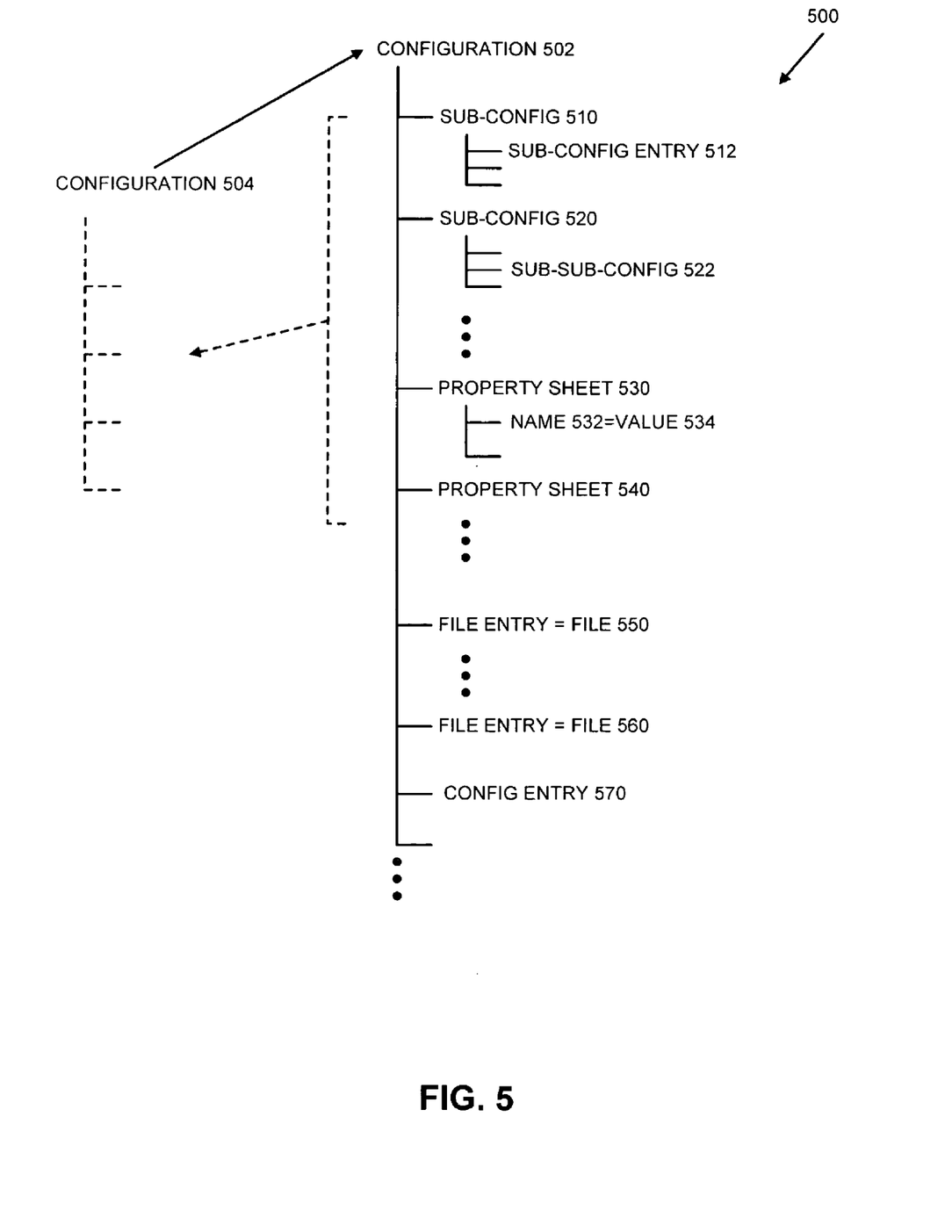
FIG. 5 is a block diagram of an embodiment of a configuration structure showing inheritance.

FIG. 5 is a block diagram of an embodiment of a configuration structure showing inheritance. Configuration architecture 500 provides one example of a configuration architecture that may be applicable to any embodiment of a configuration or configuration settings described herein. Configuration architecture includes configuration 502, which could be considered the primary, default, or target configuration. Configuration 502 could be, for example, a template from which local configuration is derived.

Configuration 502 may include any number of configuration properties, examples of which are shown in FIG. 5. For example, configuration 502 includes sub-configuration 510, which may include entries (e.g., sub-configuration entry 512) of properties or settings for the configuration. Configuration 502 also includes sub-configuration 520, which may in turn include sub-sub-configuration 522. Thus, within each sub-configuration, the different possible value entries or other sub-configurations may exist.

In one embodiment, configuration 502 shows a special configuration called property sheet 530, which represents a configuration entry that includes multiple properties as a single configuration setting entity. Property sheet 530 includes a name-value pairs (and not file entries), as with known JAVA properties. Specifically shown is a name 532 that is given value 534. In an actual implementation, name 532 may represent some setting or property, like any other configuration entry. In one embodiment, configuration 502 includes file entry 550 and file entry 560. File entries map keys to a large portion of data (e.g., a binary executable, or file). Configuration 502 may also include any number of configuration entries 570, which can map a name or label to a smaller portion of data (smaller in comparison to the larger portions to which file entries are mapped).

Configuration 504 is shown deriving from configuration 502. Note that configuration 502 may inherit one or more or all of the properties of configuration 502. If nothing is locally overwritten in derived configuration 504, all content (normal configurations, property sheets with their entries, configuration entries, and file entries) are derived to configuration 504. In one embodiment, configuration 502 is a configuration template, and configuration 504 is a configuration for an instance implementation.

Figure 6:
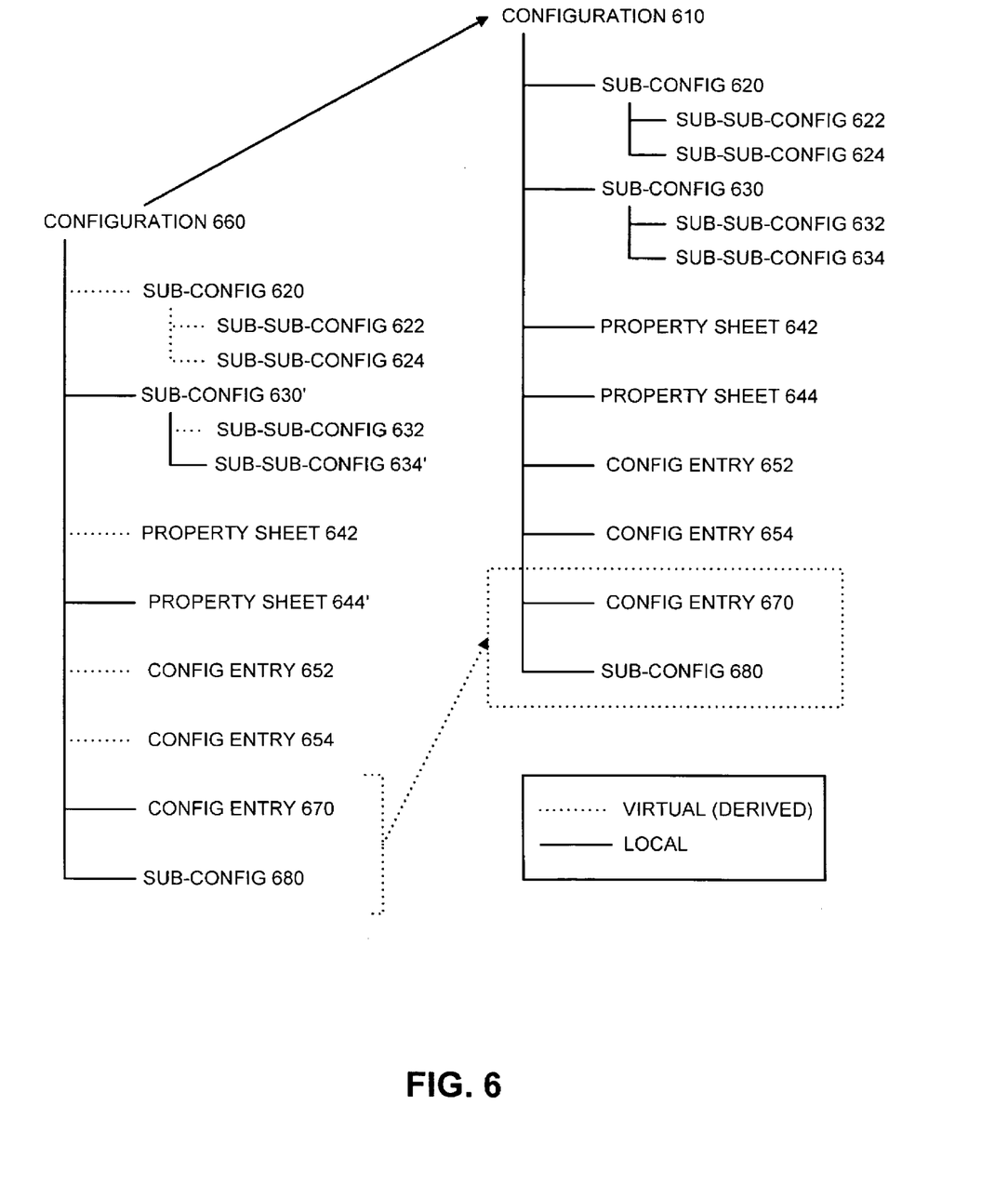
FIG. 6 is a block diagram of an embodiment of a configuration structure showing inheritance and local overwriting of a property and sub-configuration.

FIG. 6 is a block diagram of an embodiment of a configuration structure showing inheritance and local overwriting of a property. Configuration 610 provides an example of a configuration according to any configuration or configuration setting described herein. Configuration 610 can include any type of configuration property or settings, and is specifically shown with sub-configuration 620, which in turn includes sub-sub-configurations 622-624. Configuration 610 also includes sub-configuration 630, which in turn includes sub-sub-configurations 632-634. Configuration 610 also includes property sheets 642-644, and configuration entries 652-654.

Configuration 660 is derived from configuration 610, and in one embodiment inherits all properties of configuration 610 from which it is derived. Thus, configuration 660 includes sub-configuration 620 with sub-sub-configurations 622-624, configuration 630' with sub-sub-configurations 632 and 634', property sheets 642 and 644', and configuration entries 652-654. Configuration 660 also includes configuration entry 670 and sub-configuration 680, which are local and not derived from configuration 610. Note that dashed lines represent properties that are derived, and may not exist locally within configuration 660, except as is discussed in more detail below. Solid lines represent properties that exist locally. Thus, configuration 660 includes references to the configuration properties of configuration 610 for sub-configuration 620 and its sub-sub-configurations, configuration sub-configuration 630'/sub-sub-configuration 632, property sheet 642, and configuration entries 652-654. Content that exists locally may be stored within a configuration storage, which content is loaded into memory for system implementation. Content that exists virtually is calculated/merged from the linked/target configuration, and exists at the derived configuration level only in memory, and not in the configuration storage.

The other content exists locally at configuration 660. In the case of sub-configuration 630 and its sub-sub-configurations, assume that configuration 660 specifies a modification of sub-sub-configuration 634. Because of the difference, configuration 660 overwrites the derived configuration, and provides its own value for sub-sub-configuration 634, converting sub-sub-configuration 634 into sub-sub-configuration 634', to indicate the modification. Because configuration 660 provides its own local value, the structure of sub-sub-configuration 634', and consequently sub-configuration 630 with respect to sub-sub-configuration 634' is also generated locally. Thus, configuration 660 generates (or the configuration machine generates for configuration 660) sub-configuration 630', but not sub-sub-configuration 632, because the content of sub-sub-configuration 632 has not been overwritten and so it still exists virtually. In one embodiment, sub-sub-configuration 632 is flagged within configuration 610 as final or non-modifiable, which may provide a circumstance in which sub-sub-configuration 634' would be modified locally, and sub-sub-configuration 632 would not be. Similarly, assuming configuration 660 provides one or more local values for property sheet 644, the property sheet structure is generated locally. Merging of property sheets may be performed at the content level, meaning individual items (properties, values) of the property can be modified, incorporated, inherited, etc. Thus, property sheet 644' may include one or more values different from property sheet 644, and may include derived and local content.

Configuration entry 670 represents local configuration data at configuration 660, and although it provides configuration information, it does not conflict with (overwrite) content from target configuration 610. Additionally, configuration 660 may include local sub-configuration 680. In one embodiment, local content that does not overwrite content from the target configuration is still treated as derived. Thus, the configuration information is managed as though configuration entry 670 and sub-configuration 680 are derived from configuration 610, even though no such properties and configurations exist at configuration 610. Treating the local properties as derived can allow the system to more easily maintain consistency of configuration. If at a later time sub-configuration 680, for example, is added to configuration 610 to be pushed throughout the network, there would not be inconsistency with configuration 660, as it would then be simply overwriting default content with local settings.

Figure 7:
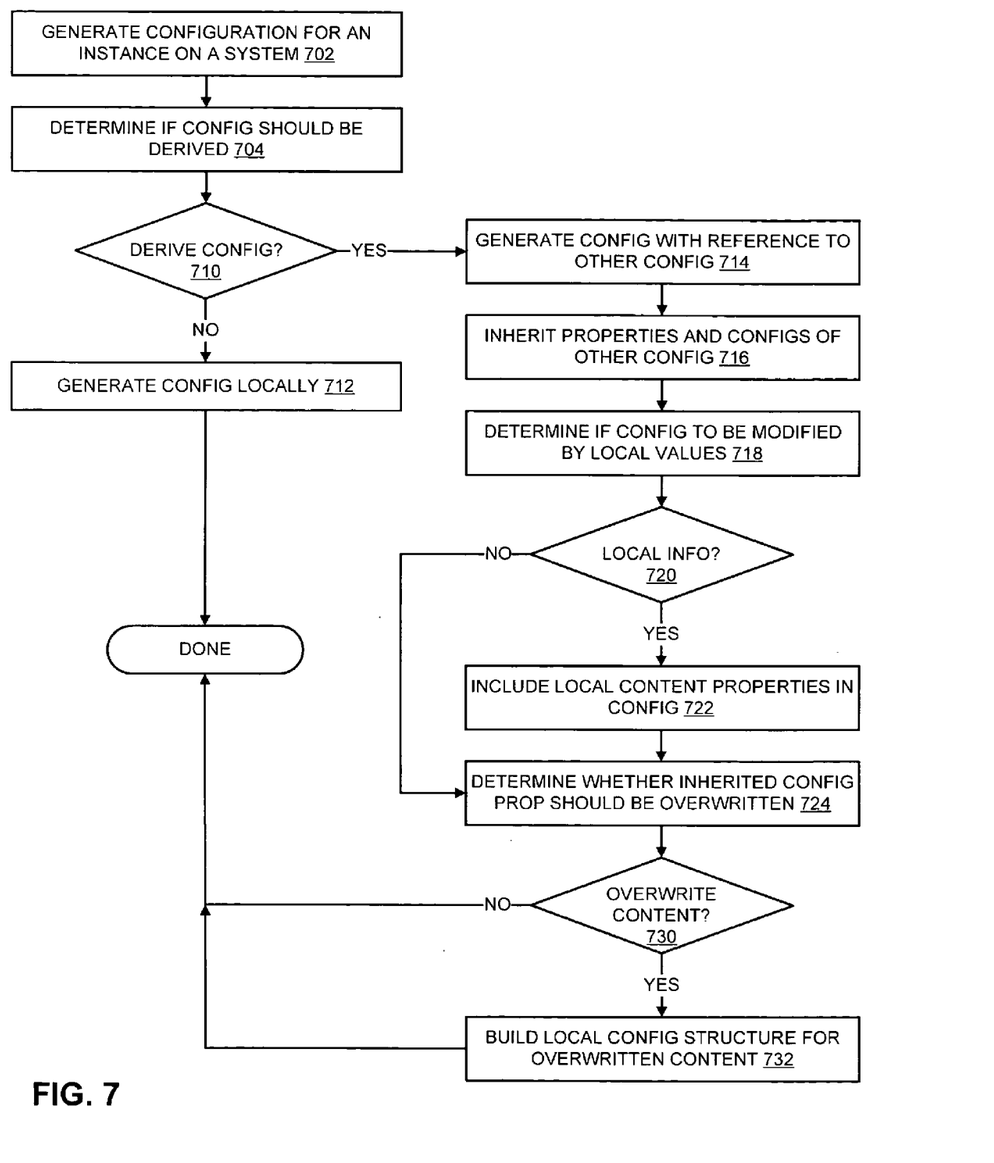
FIG. 7 is a flow diagram of an embodiment of providing configuration inheritance.

FIG. 7 is a flow diagram of an embodiment of providing configuration inheritance. When a request is made for an instance of an object with which a configuration is associated, a configuration is generated for the instance of the requesting system, 702. A configuration machine handles the process or at least manages the generation of configuration for the system instance. The configuration machine determines whether to inherit the configuration from another existing configuration, 704. The configuration machine may determine from where (e.g., from what template) the instance configuration will be derived. As described herein, templates may exist for various types of configuration, and the configuration can determine the appropriate configuration defaults. If the configuration is not to be derived, 710, it is outside the scope of this discussion, and the process can be simply stated that the configuration machine or the requesting system generates the configuration locally, 712.

The focus of the discussion is when a configuration is to be derived, 710. The configuration machine generates or causes to be generated a configuration with reference to the target configuration, 714. The derived configuration inherits the properties and configurations of the target configuration, 716. The configuration machine may determine if the target configuration is to be modified by adding local values or properties or other content for system settings, 718. If no local content is to be added, 720, the process jumps down to determine if inherited configurations are to be changed, 724. If local content is to be added, 720, the configuration machine adds the local content properties to the local configuration, 722. The added values are managed by the configuration machine as though they are derived from the target configuration, even though they only exist locally.

The system may request that certain content/properties within the target configuration be overwritten locally to change the default settings for the local implementation, 724. If no content is to be overwritten, 730, the process with regard to configuration inheritance may end. If content is to be overwritten, 730, the configuration machine ensures consistency is maintained between the local content and the target configuration (the default). Thus, the configuration machine can generate configuration structures locally for overwritten content to provide proper management of the content, 732. Thus, a change to a value within a configuration setting may involve a simple change in the derived configuration, or it could include generation of one or more data structures to provide the content locally to the derived configuration.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   deriving a second configuration from a first configuration, the second configuration being for an associated system;
   inheriting properties of the first configuration to the derived second configuration, the inherited properties to exist locally at the first configuration and virtually at the second configuration;
   storing the inherited properties and at least one local value setting of the associated system in a storage device as the second configuration, wherein an indirect reference to the properties of the first configuration is stored locally at the second configuration; and
   overwriting at least one of the inherited properties with a value local to the second configuration, the value local to the second configuration obtained from the at least one local value setting.

2. The method of claim 1, wherein the first configuration comprises a default template configuration.

3. The method of claim 1, wherein the second configuration comprises a system-level configuration implementation.

4. The method of claim 1, wherein inheriting the properties of the first configuration comprises:
   inheriting all properties of the first configuration to the second configuration.

5. The method of claim 1, wherein the at least one local value setting is managed by a configuration machine as though the at least one local value setting were an inherited property.

6. The method of claim 1, wherein overwriting the at least one of the inherited properties with the local value further comprises:

building within the second configuration a structure of the at least one of the inherited properties to store locally the at least one of the inherited properties with the local value.

7. The method of claim 6, wherein building the structure within the second configuration further comprises:
building only the overwritten at least one of the inherited properties and any base structure; and leaving un-built non-overwritten content of the first configuration structure.

8. An article of manufacture comprising a non-transitory machine-readable storage medium having content stored thereon to provide instructions to cause a machine to perform operations, including:
deriving a configuration from a default template configuration to generate an implementation of the default template configuration within the context of a system;
inheriting a property of the default template configuration to the derived configuration, the inherited property to exist locally at the default template configuration and virtually at the derived configuration, wherein an indirect reference to the property of the default template configuration is stored locally at the derived configuration; and
modifying the derived configuration to include a local property not derived from the default template configuration, wherein the modifying comprises overwriting the inherited property with the local property.

9. The article of manufacture of claim 8, wherein the context of the system comprises a cluster of application services of a server in a network.

10. The article of manufacture of claim 8, wherein the inherited property to exist virtually at the derived configuration comprises:
the inherited property to exist in a memory, and not in a configuration storage at the derived configuration level.

11. The article of manufacture of claim 8, wherein the instructions to perform modifying the derived configuration to include a local property not derived from the default template configuration further comprises instructions to perform:
generating the local property physically at the derived configuration; and
generating a reference from the local property to the default template configuration, even though the local property does not exist in the default template configuration.

12. The article of manufacture of claim 11, the content further comprising instructions to perform:
inheriting content related to the local property from the default template configuration to the derived configuration if the local property is subsequently added to the default template configuration.

13. An apparatus comprising:
a network interface circuit to connect a network having a configuration consumer device to receive a system-level configuration, and a system configuration store having a system profile for the configuration consumer device; and
a configuration machine coupled to the network interface circuit to derive the system-level configuration from a default-level configuration, the configuration machine to inherit a property from the default-level configuration to the system-level configuration, a data structure of the inherited property to exist within the default-level configuration and virtually at the system-level configuration, and the system-level configuration to include a property local to the system-level configuration different from the default-level configuration and a reference to the data structure, wherein the inherited property is overwritten with the property local to the system-level configuration.

14. The apparatus of claim 13, wherein the system profile includes hardware dependencies and system dependencies.

15. The apparatus of claim 13, wherein the derived content of the system-level configuration comprises object references to objects of the default-level configuration.

16. A computer-implemented method for configuring a system, comprising:
providing a default configuration, the default configuration to provide default values for configuration properties applicable to multiple configuration instances, the default configuration having content indicated as non-modifiable;
using a configuration machine, deriving a derived configuration from the default configuration;
inheriting the properties of the default configuration to the derived configuration, the inherited properties to exist locally at the default configuration and virtually at the derived configuration, wherein the derived configuration includes a reference to the properties of the default configuration; and
overwriting an inherited configuration property of the inherited properties not indicated as non-modifiable with a value local to the derived configuration.

17. The method of claim 16, wherein the default configuration is indicated as a whole to be non-modifiable to indicate all content of the default configuration is non-modifiable.

\* \* \* \* \*